(12) United States Patent
Keum et al.

(10) Patent No.: US 9,509,739 B2
(45) Date of Patent: Nov. 29, 2016

(54) METHOD AND APPARATUS FOR PLAYING LIVE CONTENT

(71) Applicant: Samsung Electronics Co., Ltd., Suwon-si, Gyeonggi-do (KR)

(72) Inventors: Ji Eun Keum, Suwon-si (KR); Jae Yeon Song, Seoul (KR); Bo Sun Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/196,445

(22) Filed: Mar. 4, 2014

(65) Prior Publication Data

US 2014/0189146 A1 Jul. 3, 2014

Related U.S. Application Data

(63) Continuation of application No. 13/086,757, filed on Apr. 4, 2011, now Pat. No. 8,667,164.

(30) Foreign Application Priority Data

Apr. 26, 2010 (KR) ........................ 10-2010-0038677
Apr. 28, 2010 (KR) ........................ 10-2010-0039289

(51) Int. Cl.
*G06F 15/16* (2006.01)
*H04L 29/06* (2006.01)

(52) U.S. Cl.
CPC .......... *H04L 65/60* (2013.01); *H04L 65/4084* (2013.01); *H04L 65/80* (2013.01)

(58) Field of Classification Search
USPC ........................................................ 709/203
See application file for complete search history.

(56) References Cited

U.S. PATENT DOCUMENTS

2005/0089035 A1\* 4/2005 Klemets et al. .............. 370/390
2005/0091190 A1\* 4/2005 Klemets ........................... 707/1
2007/0174881 A1\* 7/2007 Idehara et al. .................. 725/90
2007/0250636 A1 10/2007 Stephens (Continued)

FOREIGN PATENT DOCUMENTS

JP 2003-235032 A 8/2003
JP 2005-130196 A 5/2005

(Continued)

OTHER PUBLICATIONS

"ETSI TS 126 234 v9.1.0 (Jan. 2010) Technical Specification", dated Jan. 2010, pp. Cover page, 31-39, 53-60, 84-85 and 166.\*

(Continued)

*Primary Examiner* — Richard G Keehn
(74) *Attorney, Agent, or Firm* — Jefferson IP Law, LLP (57) ABSTRACT

A method for providing a client with a playlist of content segments accessible in a live streaming service provided in a Hypertext Transfer Protocol (HTTP) adaptive streaming format is provided. A live content processing method for a broadcast system includes transmitting and updating content-related information sent from a server to a client, checking, at the client, content segments accessible in real time and saving a previous content-related information, retrieving the content segments playable by referencing the previous content-related information, determining, at the client, whether the content requested for playback can be playable using a playlist, and notifying the user of the playback result.

18 Claims, 4 Drawing Sheets

(56) References Cited

U.S. PATENT DOCUMENTS

| | | |
|---|---|---|
| 2007/0260743 A1 | 11/2007 | Oijer |
| 2008/0086570 A1 | 4/2008 | Dey et al. |
| 2008/0313308 A1* | 12/2008 | Bodin et al. ............ 709/219 |
| 2009/0106443 A1* | 4/2009 | Klemets ................. 709/231 |
| 2010/0011285 A1* | 1/2010 | Kawata et al. .......... 715/246 |
| 2010/0086283 A1 | 4/2010 | Ramachandran et al. |
| 2011/0229111 A1* | 9/2011 | Bonarrigo et al. ...... 386/278 |
| 2012/0290644 A1 | 11/2012 | Gabin et al. |
| 2013/0254631 A1 | 9/2013 | Luby et al. |

FOREIGN PATENT DOCUMENTS

| | | |
|---|---|---|
| JP | 2009-260947 A | 11/2009 |
| JP | 2013-505680 A | 2/2013 |
| JP | 2013-517676 A | 5/2013 |
| WO | 2007/125389 A1 | 11/2007 |

OTHER PUBLICATIONS

Universal Mobile Telecommunications System (UMTS); LTE; Transparent end-to-end Packet-switched Streaming Service (PSS); Protocols and codecs (3GPP TS 26.234 version 9.2.0 Release 9), Technical Specification, European Telecommunications Standards Institute (ETSI), 650, Route Des Lucioles; F-06921 Sophia-Antipolis; France, vol. 3GPP SA 4, No. V9.2.0, XP014046628, Apr. 2010.

"ETSI TS 126 234 v9.1.0 (Jan. 2010) Technical Specification", dated Jan. 2010, pp. Cover page, 31-39,53-60,84-85 and 166.

* cited by examiner

METHOD AND APPARATUS FOR PLAYING LIVE CONTENT

PRIORITY

This is a continuation application of a prior application Ser. No. 13/086,757, filed Apr. 14, 2011, which claimed the benefit under 35 U.S.C. §119(a) of a Korean patent application filed on Apr. 26, 2010 in the Korean Intellectual Property Office and assigned Ser. No. 10-2010-0038677, and a Korean patent application filed on Apr. 28, 2010 in the Korean Intellectual Property Office and assigned Ser. No. 10-2010-0039289, the entire disclosures of which are hereby incorporated by reference.

BACKGROUND OF THE INVENTION

1. Field of the Invention

The present invention relates to a live content processing method of a digital broadcast system. More particularly, the present invention relates to a method for providing a client with a playlist of content segments accessible in a live streaming service provided in a Hypertext Transfer Protocol (HTTP) adaptive streaming format.

2. Description of the Related Art

In order to provide content to client devices in a way that enables a terminal to adapt to variations in available bandwidth by seamlessly switching while receiving and playing the content, it is necessary to provide the terminal with information on the content related to a playback time and bandwidth for the segments of the content in advance. A file used for transmitting the information on the content is called a Multimedia Presentation Description (MPD) file. In order to properly support the multimedia transmission in a time-varying environment, the MPD file transmitted from a server to a client should be updated as time goes on. In a case of a real time live broadcast, when live content is generated, it is necessary to update the corresponding MPD file.

Figure 1:
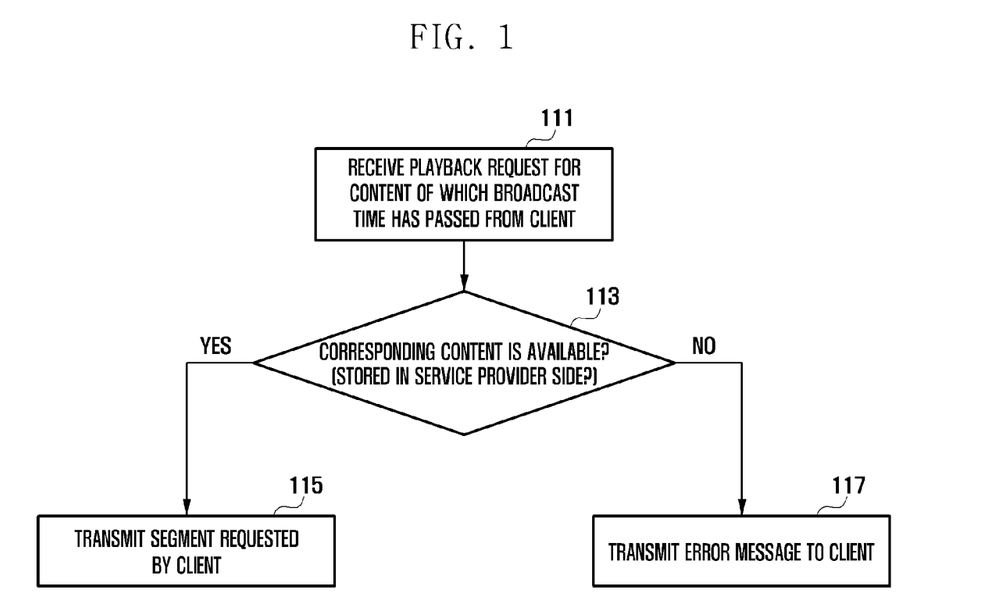
FIG. 1 is a flowchart illustrating a procedure for processing live content in a server according to the related art.

FIG. 1 is a flowchart illustrating a procedure for processing live content in a server according to related art.

Referring to FIG. 1, when a request for content, of which a broadcast time has passed, is received at step 111, the server verifies availability of the content (i.e. the server verifies whether the content is saved in the server) at step 113. If the content is determined to be available on the server, at step 113, the server transmits the corresponding content to the client at step 115. Otherwise, if the content is not available on the server, the server then transmits an error message to the client at step 117.

In the procedure illustrated in FIG. 1, the client requests the content without awareness of whether the content is currently playable such that, when the segment of the content is available, the server transmits the content segment and, otherwise, the server transmits the reject message. However, such a content processing method results in resource waste and delays in content playback, resulting in degradation of content provision service quality.

SUMMARY OF THE INVENTION

Aspects of the present invention are to address at least the above-mentioned problems and/or disadvantages and to provide at least the advantages described below.

Accordingly, an aspect of the present invention is to provide a live content playback method and apparatus of a digital broadcast system that is capable of generating a playlist of content segments while receiving a live streaming service provided by a server in a Hypertext Transfer Protocol (HTTP) adaptive streaming format. That is, aspects of the present invention provide a method for a client to acquire a list of segments of playable content at a current time using a Multimedia Presentation Description (MPD) received in seamless broadcast of live streaming.

Another aspect of the present invention is to provide a live content playback method and apparatus of a digital broadcast system that enables a client to provide a user with a currently playable playlist, thereby preventing the client from requesting unplayable content.

Another aspect of the present invention is to provide a live content playback method and apparatus of a digital broadcast system that enables a content provider of the server to generate, when the MPD is updated in the middle of live streaming, an available segment list containing segments available from segment lists of the new and old MPDs and provide the client with the segment list.

In accordance with a first exemplary embodiment of the present invention, the server sends a client an MPD file having content-related information. The client checks for segments of the content playable in real time using the MPD file, saves previous content-related information, and retrieves playable segments of the content by referencing the previous content-related information to create a playlist. When a user of the client makes a request for playback of the previous content using the playlist, the client determines whether the requested content is playable and notifies the user of the determination result.

In accordance with a second exemplary embodiment of the present invention, when a content provider of a server side updates the MPD in the middle of live streaming, the server retrieves the segments playable from the segment lists of the new MPD and previous MPD in order to generate a playlist and transmits the playlist to the client.

In accordance with an aspect of the present invention, a content processing method of a server providing a client with a stream is provided. The method includes creating a Multimedia Presentation Description (MPD) including a list of combined segments including segments listed in a previous MPD, if a sum of timeshiftBufferDepth of the previous MPD and segment duration of the previous MPD is greater than a value obtained by subtracting an availabilityStarttime of a current MPD from a NOW, and sending the MPD to a client.

In an exemplary implementation, the creating of the combined MPD includes the current MPD segments in an interval between the availabilityStarttime of the current MPD and the NOW with the previous MPD segments existing in an interval starting at a value, which is calculated as (NOW−timeshiftBufferDepth of the previous MPD−segment duration of the previous MPD), and ending with a CheckTime.

In an exemplary implementation, the creating of the combined MPD includes, if the sum of the timeshiftBufferDepth and the segment duration is less than or equal to a value obtained by subtracting the availabilityStarttime of the current MPD from the NOW, creating the MPD including a list of segments of the current MPD.

In accordance with an aspect of the present invention, a content processing method of a client is provided. The method includes receiving a Multimedia Presentation Description (MPD), and generating a list of combined segments including segments listed in a previous MPD, if a sum of timeshiftBufferDepth of the previous MPD and segment duration of the previous MPD is greater than a value obtained by subtracting an availabilityStarttime of a current MPD from a NOW In an exemplary implementation, the generating of the combined segment includes the current MPD segments in an interval between the availabilityStarttime of the current MPD and NOW with the previous MPD segments existing in an interval starting at a value, which is calculated as (NOW−timeshiftBufferDepth of the previous MPD−segment duration of the previous MPD), and ending with a CheckTime.

In an exemplary implementation, the generating of the combined segment includes, if the sum of the timeshiftBufferDepth and the segment duration is less than or equal to a value obtained by subtracting the availabilityStarttime of the current MPD from the NOW, generating a list of segments of the current MPD.

In an exemplary implementation, the method further includes determining, when content playback is requested, whether a segment of playback-requested content exists in the list, and requesting, when a segment of the playback-requested content exists in the list, the server for the playback-requested content and playing the playback-requested content received in response to the request.

In an exemplary implementation, the method further includes presenting, when content playback is requested, the list to a user, and requesting, when content playback is requested by the user, a server for the playback-requested content and playing the playback-requested content received in response to the request.

In accordance with an aspect of the present invention, a content processing apparatus of a server providing a client with a stream is provided. The apparatus includes a previous Multimedia Presentation Description (MPD) storage for storing a previous MPD, and a playlist retrieving module for creating an MPD including a list of combined segments including segments listed in the previous MPD, if a sum of timeshiftBufferDepth of the previous MPD and segment duration of the previous MPD is greater than a value obtained by subtracting an availabilityStarttime of a current MPD from NOW, wherein the server sends the MPD to the client.

In an exemplary implementation, the combined segments include segments of the current MPD in an interval between the availabilityStarttime of the current MPD and the NOW combined with the previous MPD segments existing in an interval starting at a value, which is calculated as (NOW−timeshiftBufferDepth of the previous MPD−segment duration of the previous MPD), and ending at a CheckTime.

In an exemplary implementation, the apparatus further includes, if the sum of the timeshiftBufferDepth and the segment duration is less than or equal to a value obtained by subtracting the availabilityStarttime of the current MPD from the NOW, the playlist retrieving module creates an MPD including a list of segments of the current MPD.

In accordance with an aspect of the present invention, a content processing apparatus of client is provided. The apparatus includes a previous Multimedia Presentation Description (MPD) storage for storing a received MPD, and a playlist retrieving module for generating a list of combined segments including segments listed in a previous MPD if a sum of timeshiftBufferDepth of the previous MPD and segment duration of the previous MPD is greater than a value obtained by subtracting an availabilityStarttime of a current MPD from NOW.

In an exemplary implementation, the combined segments include current MPD segments in an interval between the availabilityStarttime of the current MPD and the NOW combined with the segments of the previous MPD existing in an interval starting at a value, which is calculated as (NOW−timeshiftBufferDepth of the previous MPD−segment duration of the previous MPD), and ending at a CheckTime.

In an exemplary implementation, the apparatus further includes, the client, if the sum of the timeshiftBufferDepth and the segment duration is less than or equal to a value obtained by subtracting the availabilityStarttime of the current MPD from the NOW, generates a list of segments of the current MPD.

In accordance with an aspect of the present invention, a content processing method of system is provided. The method includes creating, by a server, a Multimedia Presentation Description (MPD) including a list of combined segments including segments listed in a previous MPD, if a sum of timeshiftBufferDepth of the previous MPD and segment duration of the previous MPD is greater than a value obtained by subtracting an availabilityStarttime of a current MPD from NOW, sending the MPD to a client, saving, by the client, a list of segments included in the current MPD as a playlist, determining, when content playback is requested, whether the playback-requested content exists in the playlist, and requesting, when the playback-requested content exists in the playlist, the server for the playback-requested content and playing the playback-requested content received in response to the request.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although descriptions of exemplary embodiments are made with the specific features, such as names of entities defined in the Open Internet Protocol Television (IPTV) Forum (OIPF), the specific features and names of entities are used only to help understand the exemplary embodiments of the present invention. However, it is obvious to those skilled in the art that the present invention can be practiced without such features and with entities not having names defined in the OIPF. Thus, detailed description of well-known functions and structures incorporated herein may be omitted to avoid obscuring the subject matter of the exemplary embodiments of the present invention.

The descriptions are made with exemplary embodiments of the present invention to address the aforementioned technical solution. The descriptions a made with the names of the entities defined in the OIPF to simplify the explanation of the exemplary embodiments of the present invention, however, it does not limit the scope of the present invention and is applicable to the systems having similar technical background.

Exemplary embodiments of the present invention have been conceived for the purpose of seamless transmission of contents in an environment where use of online contents is increasing. Adaptive streaming technology is used to transmit the contents using variable bit rates according to a variation of available transmission bandwidth and/or capability of a user device. In adaptive streaming, a user terminal receives and plays the contents in units of segments divided according to the Hypertext Transfer Protocol (HTTP). However, the present invention is not limited thereto, and other suitable protocols or communication techniques may be used to provide the adaptive streaming.

The first exemplary embodiment of the present invention is directed to an apparatus and method for acquiring a playlist which a client can access when the client is receiving a live streaming from a server in the HTTP adaptive streaming format. The second exemplary embodiment of the present invention is directed to an apparatus and method for generating and transmitting a playlist which a client can access when a server is transmitting the live streaming to the client in the HTTP adaptive streaming format.

In a live content processing method of digital broadcasting according to the first exemplary embodiment of the present invention, the server transmits content-related information to the client and updates the content-related information. The client acquires a playable segment of the content in real time, saves the previous content-related information, searches the previous content-related information to retrieve the playable segments of the content, and generates a playlist containing the playable segments. When the user requests for the previous content with the corresponding playlist, the client checks the playability of the requested content and notifies the user of the playability result.

When the client processes the live content in the broadcast system with a content delivery server and a content provision server, the client receives an updated Multimedia Presentation Description (MPD) file (i.e. a current MPD file) from the content delivery server and extracts playable segments from the previous MPD file and the current MPD file in order to generate the playlist of the playable segments. If a content playback request is received from the user, the client determines whether the requested content is in the playlist so as to request the content provision server for transmitting the content when the content is in the playlist. When the content is not in the playlist, the content provision server outputs an error message to the user without requesting the content provision server for the content.

After creating the playlist, the client presents the playlist to a user as a prompt for the user to request one of the contents listed in the playlist. The user can request the client for the playlist before making the content playback request so that the user can request one of the playable contents by referencing the playlist provided by the client to the user. In the second exemplary embodiment, when a content provider updates the MPD in the middle of the live streaming, the content provider creates a playlist containing the playable segments extracted from the current MPD and previous MPD and transmits the playlist to the client.

Figure 2:
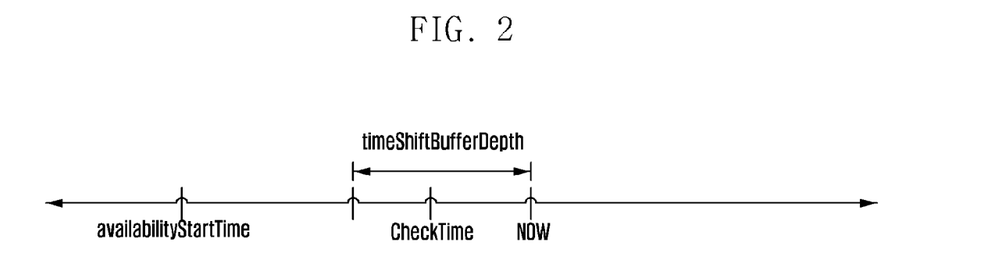
FIG. 2 is a diagram illustrating a timeline for use in a live content processing method according to an exemplary embodiment of the present invention.

FIG. 2 is a diagram illustrating a timeline for use in a live content processing method according to an exemplary embodiment of the present invention.

Referring to FIG. 2, the terms related to times used in the exemplary embodiment of FIG. 2 are in compliance with the $3^{rd}$ Generation Partnership Project (3GPP) standard specifications. Referring to FIG. 2, "NOW" denotes a time point at which the user is watching the live content, and "timeShiftBufferdepth" denotes a time duration for which a previous part of the live content is buffered in a content storage of a server. Here, the individual MPD files can have the timeShiftBufferdepths be of different lengths. The term "segment duration" denotes a time length of a segment of the content, and a "CheckTime" denotes a time point at which the client sends a service provider a MPD file request message for a MPD file update. Additionally, "availabilityStartTime" denotes a time at which the MPD file becomes available.

Figure 3:
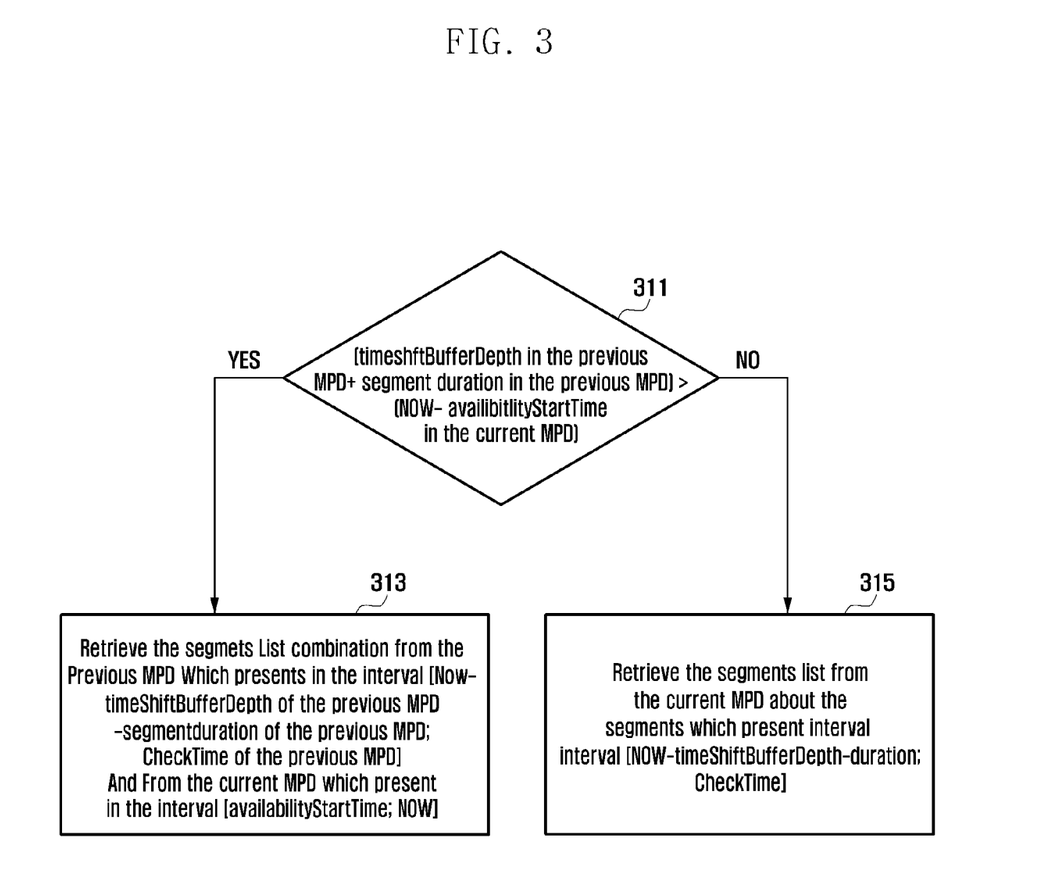
FIG. 3 is a flowchart illustrating operations of a client in a live content processing method according to an exemplary embodiment of the present invention.

FIG. 3 is a flowchart illustrating operations of a client in a live content processing method according to an exemplary embodiment of the present invention.

Referring to FIG. 3, the client acquires a list of segments accessible at a current time point based on information in a MPD file. That is, the client, according to the first exemplary embodiment, acquires the list of the playable segments of the content at the current time point in the process of updating the playlist with the MPD file in the seamless broadcast of Live Streaming. As shown in FIG. 3, when a CheckTime has arrived, the client determines whether a value acquired by summing a timeShiftBufferdepth of a previous MPD file, which is followed by the MPD file of the current content segment, and a segment duration of the previous MPD file is greater than a value acquired by subtracting a availabilityStartTime of a current content segment from the NOW at step 311. In other words, the client determines whether the following expression is true: [timeshiftbufferdepth in the previous MPD+segment duration in the previous MPD]>[NOW−availabilityStartTime in the current MPD]. If [timeshiftbufferdepth in the previous MPD+segment duration in the previous MPD] is greater than [NOW−availabilityStartTime in the current MPD] at step 311, then the client combines some of the segments of the previous MPD file and the segments from the current MPD file into a segment list at step 313. If [timeshiftbufferdepth in the previous MPD+segment duration in the previous MPD] is not greater than [NOW−availabilityStartTime in the current MPD] at step 311, then step 315 is executed and the client retrieves the segment list from the current MPD for the segments of present interval, which can be expressed as starting at [NOW−timeShiftBufferDepth duration] and ending at CheckTime.

In detail, if it is determined that [timeshiftbufferdepth in the previous MPD+segment duration in the previous MPD] is greater than [NOW−availabilityStartTime in the current MPD] at step 311, the client retrieves the content segments playable at the current time from among the segments belonging to the previous MPD. That is, the client retrieves the list of the segments playable between the time point of the value obtained by subtracting the timeShiftBufferDepth of the previous MPD and the segment duration of the previous MPD from the current time NOW and the CheckTime. The client also retrieves the segments playable at the current time NOW from among the segments belonging to the current MPD. That is, the client retrieves the list of the segments playable between the availabilityStartTime of the current MPD and the current time NOW. Through the process of combining the segments of the current MPD that are playable in the interval beginning at a value, which is calculated as (NOW−timeShiftBufferDepth of the previous MPD−segment duration in the previous MPD), and ending at the CheckTime of the previous MPD, the client creates the playlist of the segments playable at the current time point NOW.

The client saves the playlist created as described above. Afterward, if the user requests playback of the segment of the content which has been played at a previous time point, and if the requested content is in the saved playlist, the client sends the server a request message for the segment at the corresponding time point. Otherwise, the server outputs an error message to the user without requesting the content provision server for the transmission of the corresponding segment. The client can be configured to notify the user of the playable time points at current time point such that the user does not request unplayable content unnecessarily.

Figure 4:
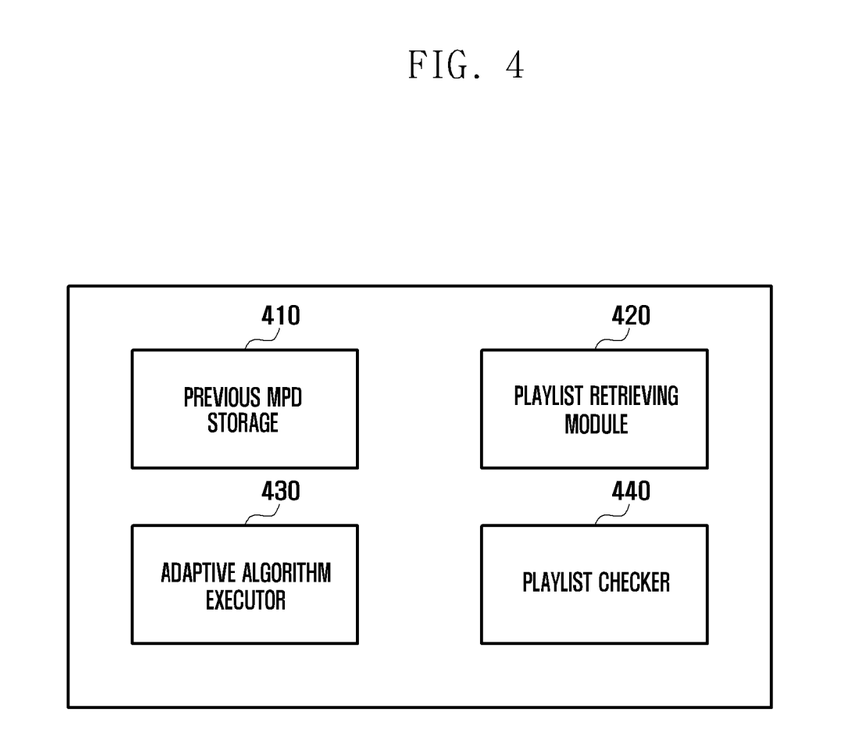
FIG. 4 is a block diagram illustrating a configuration of a client for supporting a live content processing method according to an exemplary embodiment of the present invention.

FIG. 4 is a block diagram illustrating a configuration of a server or client for supporting the live content processing method according to an exemplary embodiment of the present invention.

Referring to FIG. 4, the previous MPD storage 410 stores a previous MPD other than the MPD for content segments which are played currently. The playlist retrieving module 420 retrieves a list of the segments which the client can request the server to play. The playlist retrieving module 420 can create the playlist while performing the procedure as depicted in the embodiment of FIG. 3. The adaptive algorithm executor 430 retrieves the segments of the contents appropriate for the available bandwidth and the device capability of the client. The playlist checker 440 determines whether the segment at the time point requested by the user is contained in the playlist created by the playlist retrieving module 420.

Figure 5:
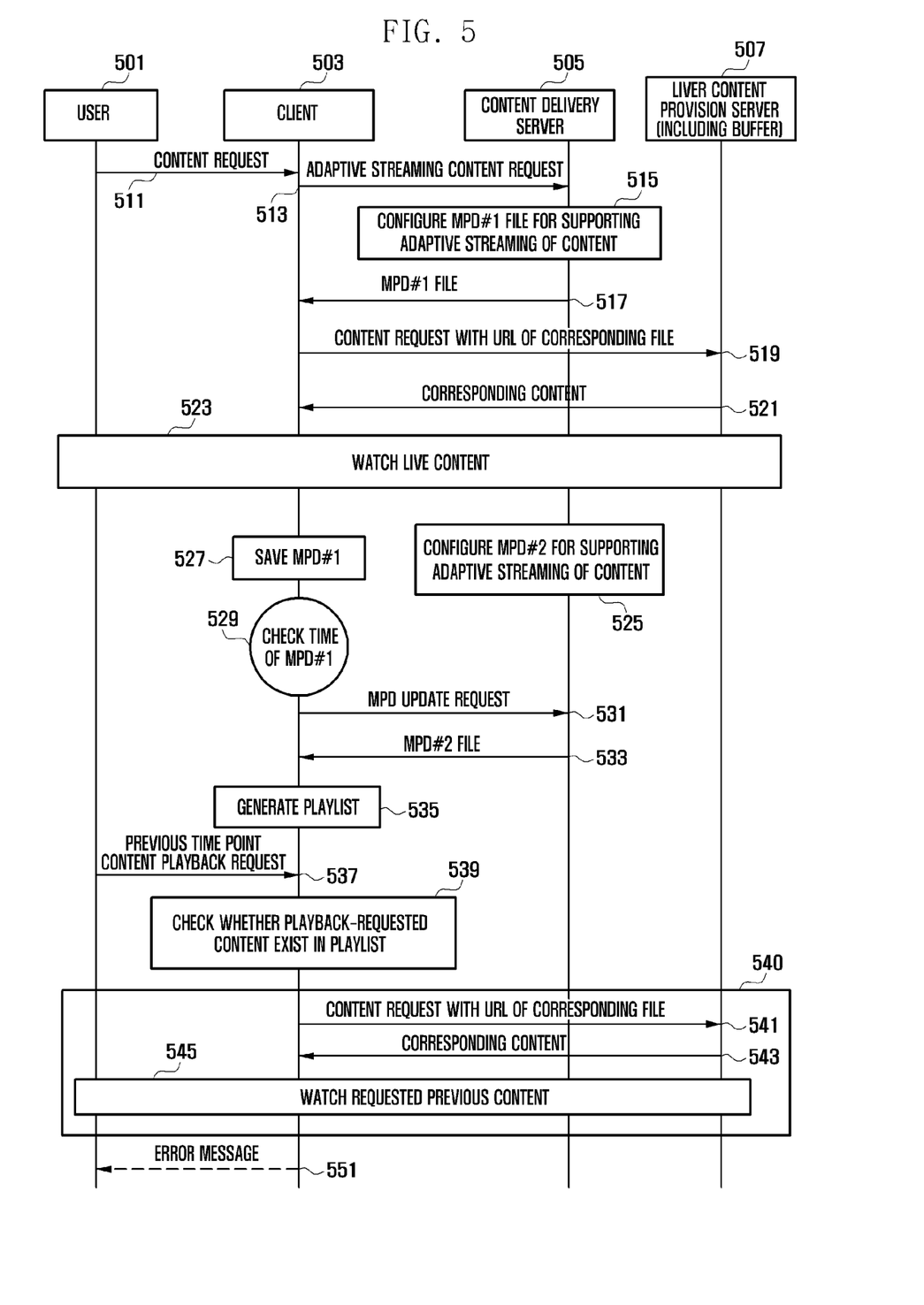
FIG. 5 is a signaling diagram illustrating a message flows among a client and servers in a live content processing method according to an exemplary embodiment of the present invention.

FIG. 5 is a signaling diagram illustrating message flows among a client and servers in a live content processing method according to an exemplary embodiment of the present invention.

Referring to FIG. 5, a content server 505 is a server which generates an MPD for providing contents to a client 503 and the content server 505 belongs to the service provider. If a user 501 sends a content request message 511 to the client 503 at step 511, the client 503 then sends an adaptive streaming content request message 513 to the content delivery server. Upon receipt of the adaptive streaming content request message, the content delivery server 505 configures a MPD#1 file, which is a first MPD file, for supporting adaptive streaming of the content at step 515. The content delivery server 505 then sends the client 503 the MPD#1 file generated for the transmission of the corresponding content at step 517. If the MPD#1 file is received, then the client 503 connects the individual segments of the content to Uniform Resource Locators (URLs) of the live content provision server 507. In other words, the client 503 requests the contents located via the URLs of the corresponding file at step 519 and the live content provision server 507 transmits the segment requested by the client 503 to the client 503 at step 521. Accordingly, the user 501 can watch the requested content as shown at step 523.

When the service provider updates the MPD, the content delivery server 505 configures a MPD#2 file, which is the next MPD file, for supporting active streaming of the content at step 525. Meanwhile, the client 503 saves the MPD#1 file, which is the previous MPD file, at step 527, monitors the signaling in order to detect an arrival of the CheckTime for the MPD#1 file at step 529. When the CheckTime has arrived, the client 503 sends the content delivery server 505 an MPD update request message at step 531. Upon receipt of the MPD update request message, the content delivery server 505 sends the client 503 the MPD#2 file at step 533.

If the MPD#2 file is received, then, at step 535, the client 503 generates the playlist according to the procedure shown in the exemplary embodiment of FIG. 3. Here, the previous MPD can be the MPD#1, and the current MPD can be the MPD#2.

At step 537, the user 501 requests the client 503 for the playback of the content at a previous time point. Then, at step 539, the client 503 determines whether the segment at the time point requested by the user 503 exists in the current playlist. If the requested content segment exists in the playlist generated at step 535, then, at step 541, the client requests the live content provision server 507 for the corresponding segment and the live content provision server 507 transmits the requested segment to the client 503 at step 543. Accordingly, the user 501 can watch the content at the previous time point at step 545. If the segment at the user-requested time point is not in the current playlist, the client 503 outputs an error message to the user 501 at step 551.

As described above, if the user request for content playback at a previous time point in the state when a playlist is created and saved in the client 503, the client 503 determines whether the playback-requested content exists in the playlist. If the playback-requested content exists in the playlist, the client 503 controls playback such that user 501 can watch the content requested and received from the live content provision server 507 while performing the process at step 540. Otherwise, if the playback-requested content does not exist in the playlist, the client 503 outputs the error message to the user 501 at step 551 without requesting the live content provision server 507 for the playback-requested content. In this manner, the content processing method and apparatus, according to an exemplary embodiment of the present invention, is capable of preventing the client from requesting unavailable content unnecessarily, thereby reducing resource waste and avoiding a playback delay to the user.

The client 503 can be configured to present the playlist of the segments that can be played currently such that the user cannot request the unplayable segments. That is, the client 503 can display the playlist created at step 535 such that the user 501 checks the playlist. In this case, the user 501 can request for only the playable segments listed in the playlist. In another exemplary case, the user can request the client 503 for the playlist such that the user can request the content available by referencing the playlist provided by the client 503.

A description is made of the second exemplary embodiment of the present invention is provided below.

In the second exemplary embodiment of the present invention, when creating a new MPD for updating the MPD, the server creates the new MPD including a list, i.e., a playlist, of the segments that are still accessible from among the segments managed in the previous MPD. The server transmits the new MPD, including the newly created playlist, to the client 503 in order to update the previous MPD. In the second exemplary embodiment of the present invention, the operations of the exemplary embodiment of FIG. 3 can be performed by the content delivery server 505. When the content provider updates the MPD for the live streaming service, the new MPD has to include all the segments available with the segments of the previous MPD. When the sum of the time ShiftBufferdepth of the previous MPD and the segment duration is greater than the value obtained by subtracting the availabilityStartTime of the current MPD from NOW, the new MPD includes all the media segments in which the sum of the media segment and the start time of the period exists in the interval starting from the NOW−timeshiftBufferDepth duration of the current MPD and the previous MPD and ending with the CheckTime.

When the sum of the timeShiftBufferdepth of the previous MPD and the segment duration is greater than the value obtained by subtracting the availabilityStartTime of the current MPD from NOW, the playlist includes all the media segments in which the sum of the media segment and the start time of the period exists in the interval between the NOW-timeShiftBufferDepth-duration of the current MPD and previous MPD and the CheckTime.

When the sum of the timeShiftBufferdepth and the segment duration is greater than the value obtained by subtracting the availabilityStartTime of the current MPD from NOW, the new MPD includes all the media segments in which the sum of the corresponding media segment and the start time of the period is in the interval starting with the NOW timeshiftBufferDepth duration of the current MPD and previous MPD and ending with a one of the CheckTime, NOW, and availabilityStartTime+mediaPresentationDuration having the least value.

When content provider updates the MPD for live streaming, the new MPD should include all available segments including the segments list in the previous MPD. If the sum of timeShiftBuffer in the previous MPD and segment duration in the previous MPD is larger than NOW−availabilityStartTime in the current MPD, the playlist should include the combination of the media segments for which the sum of the start time of the Media Segment and the period start time falls in the interval starting with NOW timeShiftBufferDepth duration and ending with the CheckTime of the current MPD and the previous MPD.

In the live content processing method and apparatus for a digital broadcast system including at least one server and a client according to the exemplary embodiments, when a playback request for a specific content is input by the user, the client requests, if the content is available, the server for the corresponding content and, otherwise, the client outputs an error message to the user. Accordingly, the live content processing method and apparatus of the present invention is capable of preventing a request for unavailable content when processing live contents of the digital broadcast system. Thus, it is possible to improve resource utilization efficiency and content processing efficiency and reduce playback delay, resulting in improvement of service quality.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A method of providing content by a server, the method comprising:
   updating, by the server, a previous multimedia presentation description (MPD) to a current MPD including available segment information in the previous MPD, the available segment information being determined by the server based on a time duration of a buffer (timeShiftBufferDepth) of the previous MPD, a segment duration in the previous MPD and a time at which the current MPD becomes available (availability StartTime);
   transmitting, to a client, the current MPD; and
   receiving, from the client, a request for content based on a determination by the client regarding the transmitted current MPD.

2. The method of claim 1, wherein the current MPD includes a combination of at least one segment included in the current MPD and the previous MPD, if a sum of the timeShiftBufferDepth of the previous MPD and the segment duration in the previous MPD is larger than the value obtained by subtracting the availabilityStartTime of the current MPD from a determined time point (NOW).

3. The method of claim 1,
   wherein the available segment information is determined based on a start time of the available segment information and a period start time, and
   wherein a sum of the start time of the available segment information and the period start time fall within an interval between a NOW-timeShiftBufferDepth-segment duration and a time at which the client requests the current MPD (CheckTime) of the current MPD, and within an interval between the NOW-timeShiftBufferDepth-duration and the CheckTime of the previous MPD.

4. The method of claim 1, further comprising:
   receiving, from the client, a request for a playback-requested content if a segment of playback-requested content is included in the current MPD; and
   transmitting, to the client, the segment of playback-requested content.

5. A method for providing content by a client, the method comprising:
   receiving a current multimedia presentation description (MPD) from a server;

receiving a content based on a determination by the client regarding the received current MPD; and providing the received content, wherein the current MPD includes available segment information in a previous MPD, and wherein the available segment information is determined based on a time duration of a buffer (timeShiftBufferDepth) of the previous MPD, a segment duration in the previous MPD and a time at which the current MPD becomes available (availability StartTime).

6. The method of claim 5, wherein the current MPD includes a combination of at least one segment included in the current MPD and the previous MPD if a sum of the timeShiftBufferDepth of the previous MPD and the segment duration in the previous MPD is larger than the value obtained by subtracting the availabilityStartTime of the current MPD from a determined time point (NOW).

7. The method of claim 5, wherein the available segment information is determined based on a start time of the available segment information and a period start time, and wherein a sum of the start time of the available segment information and the period start time fall within an interval between a NOW-timeShiftBufferDepth-duration and a time at which the client requests the current MPD (CheckTime) of the current MPD, and within an interval between the NOW-timeShiftBufferDepth-duration and the CheckTime of the previous MPD.

8. The method of claim 5, further comprising:

transmitting, to the server, a request for a playback-requested content if a segment of playback-requested content is included in the current MPD; and receiving, from the server, the segment of playback-requested content.

9. The method of claim 5, further comprising:

providing, if a segment of playback-requested content is not included in the current MPD, an error message.

10. A server for providing content to a client, the server comprising:

a transceiver configured to transmit and receive a signal; and a controller configured to:

update a previous multimedia presentation description (MPD) to a current MPD including available segment information in the previous MPD, the available segment information determined based on a time duration of a buffer (timeShiftBufferDepth) of the previous MPD, a segment duration in the previous MPD and a time at which the current MPD becomes available (availability StartTime), and control the transceiver to transmit the current MPD to the client and to receive a request for a content based on the current MPD from the client.

11. The server of claim 10, wherein the current MPD includes a combination of at least one segment included in the current MPD and the previous MPD if a sum of the timeShiftBufferDepth of the previous MPD and the segment duration in the previous MPD is larger than the value obtained by subtracting the availabilityStartTime of the current MPD from a determined time point (NOW).

12. The server of claim 10, wherein the available segment information is determined based on a start time of the available segment information and a period start time, and wherein a sum of the start time of the available segment information and the period start time fall within an interval between a NOW-timeShiftBufferDepth-duration and a time at which the client requests the current MPD (CheckTime) of the current MPD and within an interval between the NOW-timeShiftBufferDepth-duration and the CheckTime of the previous MPD.

13. The server of claim 10, wherein the controller is further configured to:

control the transceiver to receive, from the client, a request for a playback-requested content if a segment of playback-requested content is included in the current MPD, and transmit, to the client, the segment of playback-requested content.

14. A client including an apparatus for providing content, the apparatus comprising:

a transceiver configured to transmit and receive a signal; and a controller configured to:

control the transceiver to receive a current multimedia presentation description (MPD) from a server;

receive a content based on the current MPD; and provide the received content, wherein the current MPD includes available segment information in a previous MPD, and wherein the available segment information is determined based on a time duration of a buffer (timeShiftBufferDepth) of the previous MPD, a segment duration in the previous MPD and a time at which the current MPD becomes available (availability StartTime).

15. The apparatus of claim 14, wherein the current MPD includes a combination of at least one segment included in the current MPD and the previous MPD if a sum of the timeShiftBufferDepth of the previous MPD and the segment duration in the previous MPD is larger than the value obtained by subtracting the availabilityStartTime of the current MPD from a determined time (NOW).

16. The apparatus of claim 14, wherein the available segment information is determined based on a start time of the available segment information and a period start time, and wherein a sum of the start time of the available segment information and the period start time fall within an interval between a NOW-timeShiftBufferDepth-duration and a time at which the client requests the currentMPD (CheckTime) of the current MPD and within an interval between the NOW-timeShiftBufferDepth-duration and the CheckTime of the previous MPD.

17. The apparatus of claim 14, wherein the controller is further configured to:

control the transceiver to transmit, to the server, a request for a playback-requested content if a segment of playback-requested content is included in the current MPD, and control the transceiver to receive, from the server, the segment of playback-requested content.

18. The apparatus of claim 14, wherein the controller is further configured to provide, if a segment of playback-requested content is not included in the current MPD, an error message.

* * * * *